(12) United States Patent
Mehra et al.

(10) Patent No.: US 11,436,114 B2
(45) Date of Patent: Sep. 6, 2022

(54) AUTOMATIC PART TESTING

(71) Applicant: ADVANCED MICRO DEVICES, INC., Santa Clara, CA (US)

(72) Inventors: Amitabh Mehra, Fort Collins, CO (US); Anil Harwani, Austin, TX (US); William R. Alverson, Austin, TX (US); Grant E. Ley, Austin, TX (US); Jerry A. Ahrens, Austin, TX (US); Mustansir M. Pratapgarhwala, Austin, TX (US); Scott E. Swanstrom, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/379,442

(22) Filed: Jul. 19, 2021

(65) Prior Publication Data
US 2021/0349797 A1 Nov. 11, 2021

Related U.S. Application Data

(63) Continuation of application No. 16/715,831, filed on Dec. 16, 2019, now Pat. No. 11,068,368.

(51) Int. Cl.
*G06F 11/22* (2006.01)

(52) U.S. Cl.
CPC ...... *G06F 11/2236* (2013.01); *G06F 11/2289* (2013.01)

(58) Field of Classification Search
CPC ............. G06F 11/1417; G06F 11/2236; G06F 11/2284; G06F 11/2289; G06F 11/263
USPC .......................................... 713/1, 2; 714/23
See application file for complete search history.

(56) References Cited

U.S. PATENT DOCUMENTS

| | | | |
|---|---|---|---|
| 6,662,133 B2 | 12/2003 | Engel et al. |
| 6,795,915 B2 | 9/2004 | Wang |
| 8,964,610 B2 | 2/2015 | Chao |
| 9,983,966 B2 | 5/2018 | Parikh |
| 2002/0123854 A1 | 9/2002 | Engel et al. |
| 2017/0123927 A1 | 5/2017 | Su |
| 2018/0145041 A1 | 5/2018 | Fkih et al. |
| 2018/0336111 A1 | 11/2018 | Gendler et al. |

FOREIGN PATENT DOCUMENTS

GB          2407892 A        5/2005

OTHER PUBLICATIONS

International Search Report and Written Opinion, PCT/US2020/065170, dated Apr. 7, 2021, 13 pages.

*Primary Examiner* — Joseph R Kudirka

(57) ABSTRACT

Automatic part testing includes: booting a part under testing into a first operating environment; executing, via the first operating environment, one or more test patterns on the part; performing a comparison between one or more observed characteristics associated with the one or more test patterns and one or more expected characteristics; and modifying one or more operational parameters of a central processing unit of the part based on the comparison.

20 Claims, 6 Drawing Sheets

AUTOMATIC PART TESTING

CROSS-REFERENCE TO RELATED APPLICATIONS

This application is a continuation application of and claims priority from U.S. Pat. No. 11,068,368, issued Jul. 20, 2021.

BACKGROUND

Performance of central processing unit parts differs from a testing environment due to environmental variance and part degradation over time. Accordingly, the capabilities of a particular part changes over time or when placed in an environment different than the tested environment.

DETAILED DESCRIPTION

Figure 1:
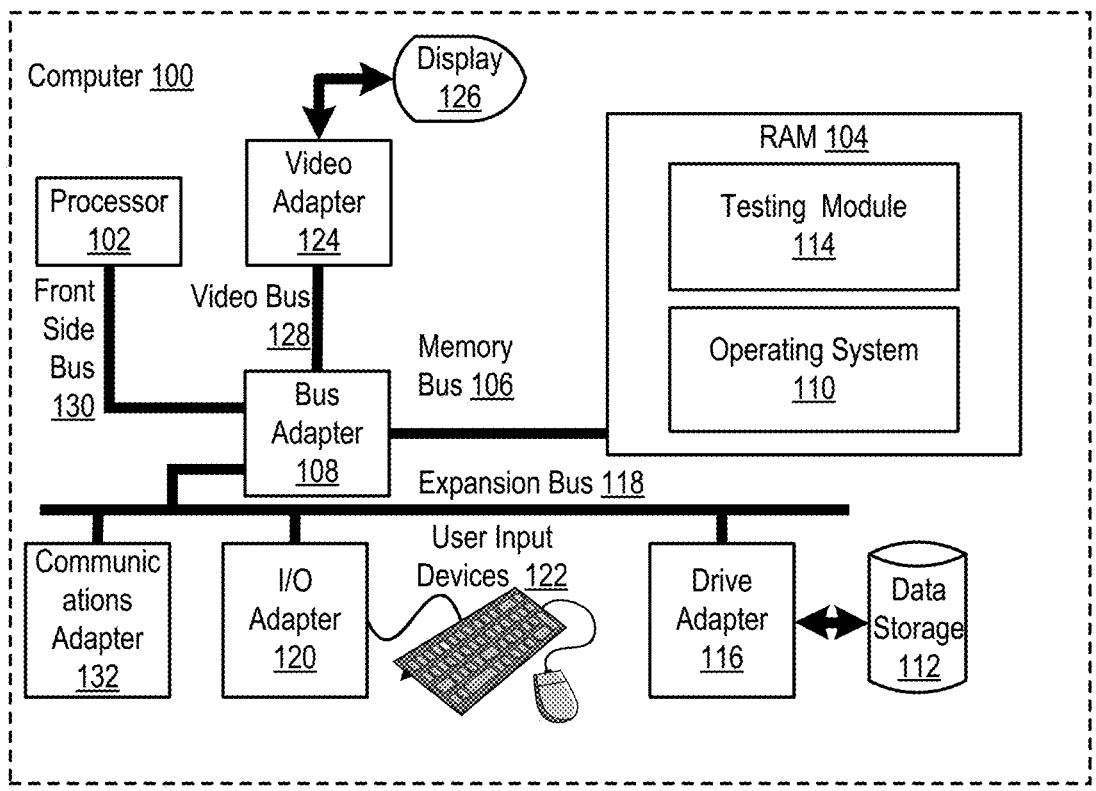
FIG. 1 is a block diagram of an example computer for automatic part testing according to some embodiments.

In some embodiments, a method of automatic part testing includes: booting a part under testing into a first operating environment; executing, via the first operating environment, one or more test patterns on the part; performing a comparison between one or more observed characteristics associated with the one or more test patterns and one or more expected characteristics; and modifying one or more operational parameters of a central processing unit of the part based on the comparison.

In some embodiments, the method includes providing the one or more observed characteristics to one or more of a basic input/output system (BIOS) or a system management unit. In some embodiments, modifying the one or more operational parameters of the central processing unit includes applying an offset or a modification to a voltage frequency curve. In some embodiments, the one or more observed characteristics include a failure state, and modifying the one or more operational parameters includes the one or more operational parameters to avoid the failure state. In some embodiments, the method includes booting the part into a second operating environment. In some embodiments, the second operating environment includes an operating system. In some embodiments, booting into the first operating environment includes loading the first operating environment from basic input/output system read-only memory (BIOS ROM).

In some embodiments, an apparatus for automatic part testing performs steps including: booting a part under testing into a first operating environment; executing, via the first operating environment, one or more test patterns on the part; performing a comparison between one or more observed characteristics associated with the one or more test patterns and one or more expected characteristics; and modifying one or more operational parameters of a central processing unit of the part based on the comparison.

In some embodiments, the steps include providing the one or more observed characteristics to one or more of a basic input/output system (BIOS) or a system management unit. In some embodiments, modifying the one or more operational parameters of the central processing unit includes applying an offset or a modification to a voltage frequency curve. In some embodiments, the one or more observed characteristics include a failure state, and modifying the one or more operational parameters includes the one or more operational parameters to avoid the failure state. In some embodiments, the steps include booting the part into a second operating environment. In some embodiments, the second operating environment includes an operating system. In some embodiments, booting into the first operating environment includes loading the first operating environment from basic input/output system read-only memory (BIOS ROM).

In some embodiments, a computer program product for automatic part testing disposed upon a computer readable medium includes computer program instructions that, when executed, cause a computer to perform steps including: booting a part under testing into a first operating environment; executing, via the first operating environment, one or more test patterns on the part; performing a comparison between one or more observed characteristics associated with the one or more test patterns and one or more expected characteristics; and modifying one or more operational parameters of a central processing unit of the part based on the comparison.

In some embodiments, the steps include providing the one or more observed characteristics to one or more of a basic input/output system (BIOS) or a System Management Unit (SMU). In some embodiments, modifying the one or more operational parameters of the central processing unit includes applying an offset or a modification to a voltage frequency curve. In some embodiments, the one or more observed characteristics include a failure state, and modifying the one or more operational parameters includes the one or more operational parameters to avoid the failure state. In some embodiments, the steps include booting the part into a second operating environment. In some embodiments, the second operating environment includes an operating system. In some embodiments, booting into the first operating environment includes loading the first operating environment from basic input/output system read-only memory (BIOS ROM).

Automatic part testing in accordance with the present disclosure is generally implemented with computers, that is, with automated computing machinery. For further explanation, therefore, FIG. 1 sets forth a block diagram of automated computing machinery including an exemplary computer 100 configured for automatic part testing according to embodiments of the present invention. The computer 100 of FIG. 1 includes at least one computer processor 102 or 'CPU' as well as random access memory 104 (RAM') which is connected through a high speed memory bus 106 and bus adapter 108 to processor 102 and to other components of the computer 100.

Stored in RAM 104 is an operating system 110. Operating systems useful in computers configured for automatic part testing include UNIX™, Linux™, Microsoft Windows™, and others as will occur to those of skill in the art. The operating system 110 in the example of FIG. 1 is shown in RAM 104, but many components of such software typically are stored in non-volatile memory also, such as, for example, on data storage 112, such as a disk drive. Also stored in RAM is the testing module 114 for automatic part testing according to certain embodiments.

The computer 100 of FIG. 1 includes disk drive adapter 116 coupled through expansion bus 118 and bus adapter 108 to processor 102 and other components of the computer 100. Disk drive adapter 116 connects non-volatile data storage to the computer 100 in the form of data storage 112. Disk drive adapters useful in computers configured for automatic part testing include Integrated Drive Electronics (IDE') adapters, Small Computer System Interface (SCSI') adapters, and others as will occur to those of skill in the art. In some embodiments, non-volatile computer memory also is implemented for as an optical disk drive, electrically erasable programmable read-only memory (so-called 'EEPROM' or 'Flash' memory), RAM drives, and so on, as will occur to those of skill in the art.

The example computer 100 of FIG. 1 includes one or more input/output (I/O') adapters 120. I/O adapters implement user-oriented input/output through, for example, software drivers and computer hardware for controlling output to display devices such as computer display screens, as well as user input from user input devices 122 such as keyboards and mice. The example computer 100 of FIG. 1 includes a video adapter 124, which is an example of an I/O adapter specially designed for graphic output to a display device 126 such as a display screen or computer monitor. Video adapter 124 is connected to processor 102 through a high speed video bus 128, bus adapter 108, and the front side bus 130, which is also a high speed bus.

The exemplary computer 100 of FIG. 1 includes a communications adapter 132 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for automatic part testing include modems for wired dial-up communications, Ethernet (IEEE 802.3) adapters for wired data communications, and 802.11 adapters for wireless data communications.

Figure 2:
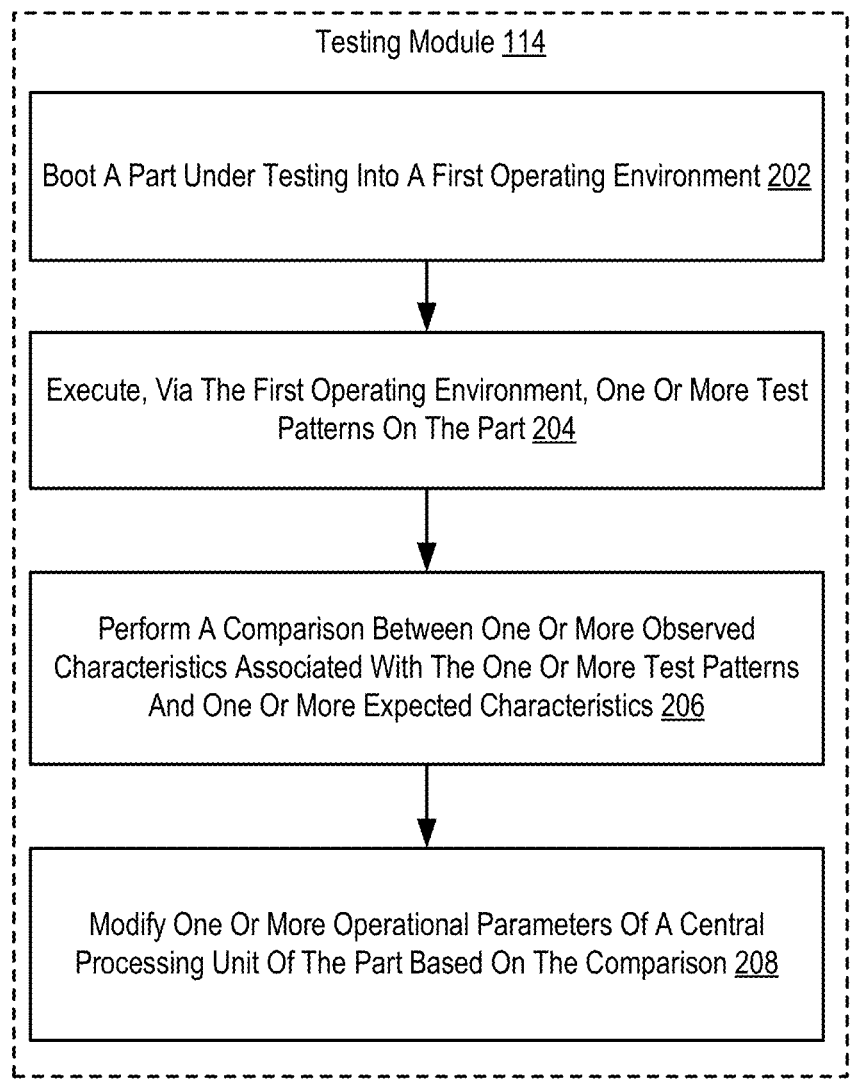
FIG. 2 is a flowchart of an example method for automatic part testing according to some embodiments.

For further explanation, FIG. 2 sets forth a flow chart illustrating an exemplary method for automatic part testing that includes booting 202 (e.g., by a testing module 114) a part (e.g., the computer 100 or a component of the computer 100) under testing into a first operating environment. The testing module 114 is loaded and executed as part of a boot process of the computer 100. The first operating environment includes a micro operating system or bootable operating environment separate from the main operating system 110 of the computer 100. Accordingly, the first operating environment is booted into prior to the main operating system 110 as part of a same boot process. In some embodiments, the first operating environment is a micro operating system or light-weight operating system dedicated to performing test operations on the computer 100, as set forth below. In an embodiment, the first operating environment is booted 202 in response to a selection or confirmation from a user. For example, a user interface presents a user with an option to boot 202 into the first operating environment prior to booting into a second operating environment such as a main operating system 100. In an embodiment, the first operating environment 202 is loaded from Read-Only Memory or other non-volatile storage on a motherboard or other hardware component separate from disk or mass storage.

The method of FIG. 2 also includes executing 204, via the first operating environment, one or more test patterns on the part. The one or more test patterns test the performance of one or more parts of the computer 100 under varying configuration or operational settings. For example, the one or more test patterns include stress tests designed to test whether one or more parts will fail under particular configuration or operational settings. Examples of such configuration or operational settings include clock speed (e.g., frequency), voltage, etc. Examples of parts targeted by the one or more test patterns include individual cores of the processor 102, the data fabric, cache, memory, etc. In some embodiments, the one or more test patters correspond to test patterns used to test a particular part (e.g., the processor 102) during development or manufacture to ensure that the given part can operate under "worst case scenario" conditions, such as a given thermal condition or under a particular stress test. In some embodiments, the one or more test patterns are automatically selected for execution. In other embodiments, the one or more test patterns are selected for execution from a plurality of test patterns in response to a user input, in response to a predefined scheduling or ordering of test pattern performance, based on other criteria.

The method of FIG. 2 also includes performing 206 a comparison between one or more observed characteristics associated with the one or more test patterns and one or more expected characteristics. As parts degrade over time, and as the computer 100 in which the parts are installed is operating in an environment different from the environment in which the parts were initially tested, the performance of the parts varies over time. Accordingly, the one or more expected characteristics correspond to expected performance metrics when executing the one or more test patterns. For example, the one or more expected characteristics include metrics relating to the execution of the one or more test patterns as a whole (e.g., a total time to execute a given test pattern or multiple test patterns, whether or not a test pattern failed execution, which operation caused a failure of a particular test pattern, etc.). As another example, the one or more expected characteristics include metrics related to the performance of a particular part (e.g., an observed frequency or voltage of a given core, whether or not a particular part failed, what test patterns or operations caused a particular part to fail, etc.).

The one or more observed characteristics are samplings or observations corresponding to the one or more expected characteristics as observed during or after the execution of the one or more test patterns. Thus, the one or more observed characteristics are compared to the one or more expected characteristics to determine how actual performance of the parts differs from the expected performance of the parts. Accordingly, the comparison identifies differentials including a difference in execution time for one or more of the test patterns, a difference in operating voltage for one or more cores at particular points during execution of the test patterns, a difference in thermal conditions, a difference in whether or not and/or where a failure state was entered for a particular part or test pattern, etc.

The method of FIG. 2 also includes modifying one or more operational parameters of a central processing unit (e.g., the processor 100) of the part based on the comparison. In some embodiments, modifying the one or more operational parameters includes applying an offset or modifications to the voltage frequency curve of a particular core. The voltage frequency curve is expressed as a graph with one axis corresponding to a voltage of the core another axis corresponding to a frequency of the core with temperature providing a third axis. Thus, the voltage frequency curve indicates, for a given voltage and temperature, a frequency (e.g., a maximum frequency) at which the core can operate. Accordingly, applying an offset to a voltage frequency curve includes increasing or decreasing one or more points on the voltage frequency curve by a particular value. In other embodiments, modifying the one or more operational parameters includes applying an offset to the margin of the voltage frequency curve. The frequency curve includes minimum and maximum values for the voltage and frequency across temperature. These minimum and maximum values are the margins of the voltage frequency curve. Applying an offset to a margin of the voltage frequency curve includes increasing or decreasing a minimum or maximum allowable voltage and/or frequency for the given core.

Modifying 208 the one or more operational parameters includes determining one or more modifications to apply. In an embodiment, observed differentials correspond to a predefined modification to apply. For example, when an execution time for a particular test falls below an expected execution time by an amount exceeding a threshold, a predefined offset to the voltage frequency curve is applied. As another example, where an expected failure state was not entered, a predefined offset to the voltage frequency curve is applied. In other embodiments, modifications are programmatically calculated based on the comparison. For example, differentials between one or more characteristics are provided as input to a function or algorithm to calculate one or more modifications to be applied.

In some embodiments, where the observed characteristic is an observed failure state, the one or more operational parameters are modified to exclude a particular configuration of the parts during the failure state. For example, where a particular voltage or voltage/frequency or voltage/frequency/temperature combination of a core caused an error, that core is modified to avoid the particular voltage or voltage frequency or voltage/frequency/temperature combination.

In an embodiment, the testing module 114 facilitates sending of the one or more observed characteristics and/or the one or more modifications to operational parameters to a server or other entity. For example, data indicating the one or more observed characteristics and/or the one or more modifications to operational parameters is stored in non-volatile memory. The data is then accessed by an application executed in the main operating system 110 and sent to the server or other entity.

After modifying 208 the one or more operational parameters, the testing module 114 allows a boot process of the computer 100 to resume. For example, the testing module 114 causes the computer 100 to boot into a primary operating system 110 for operation.

Figure 3:
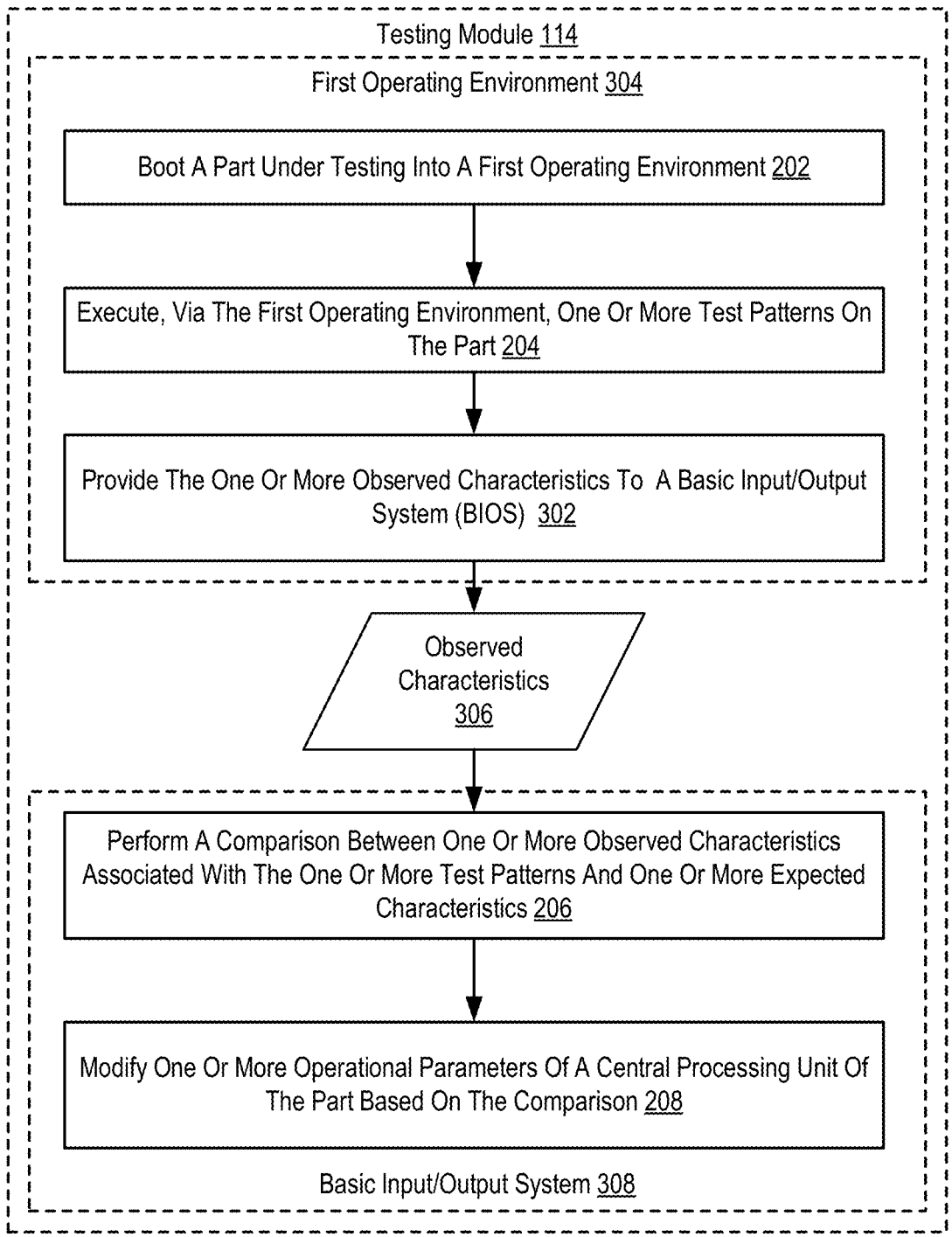
FIG. 3 is a flowchart of an example method for automatic part testing according to some embodiments.

For further explanation, FIG. 3 sets forth a flow chart illustrating an exemplary method for automatic part testing that includes booting 202 (e.g., by a testing module 114) a part under testing into a first operating environment; executing 204, via the first operating environment, one or more test patterns on the part; performing 206 a comparison between the one or more observed characteristics associated with the one or more test patterns and one or more expected characteristics; and modifying 208 one or more operational parameters of a central processing unit of the part based on the comparison.

The method of FIG. 3 differs from FIG. 2 in that the method of FIG. 3 also includes providing 302 (e.g., by the first operating environment 304) the one or more observed characteristics 306 to a Basic Input/Output System (BIOS) 308. For example, the first operating environment 304 stores data indicating the one or more observed characteristics 306 in non-volatile memory accessible to the Basic Input/Output System (BIOS) 308. As another example, the first operating environment 302 provides the one or more observed characteristics 306 as an argument or parameter to the Basic Input/Output System (BIOS) 308. Having been provided 302 the one or more observed characteristics 306, the Basic Input/Output System (BIOS) 308 then performs 206 the comparison between the one or more observed characteristics 306 and the one or more expected characteristics and modifies 208 the one or more operational parameters based on the comparison.

Figure 4:
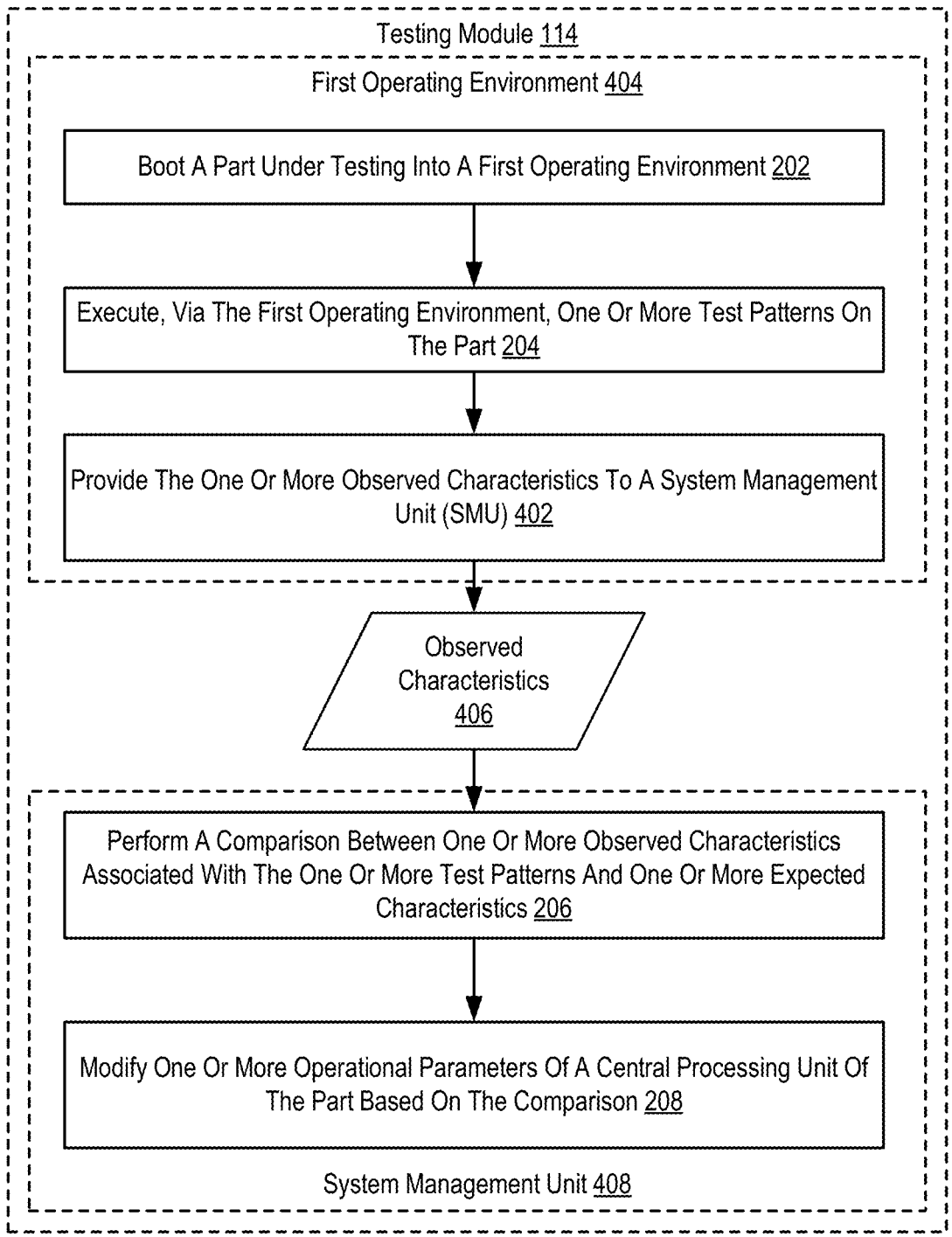
FIG. 4 is a flowchart of an example method for automatic part testing according to some embodiments.

For further explanation, FIG. 4 sets forth a flow chart illustrating an exemplary method for automatic part testing that includes booting 202 (e.g., by a testing module 114) a part under testing into a first operating environment; executing 204, via the first operating environment, one or more test patterns on the part; performing 206 a comparison between the one or more observed characteristics associated with the one or more test patterns and one or more expected characteristics; and modifying 208 one or more operational parameters of a central processing unit of the part based on the comparison.

The method of FIG. 4 differs from FIG. 2 in that the method of FIG. 4 also includes providing 402 (e.g., by the first operating environment 404) the one or more observed characteristics 406 to a System Management Unit (SMU) 408. For example, the first operating environment 404 stores data indicating the one or more observed characteristics 406 in non-volatile memory accessible to the System Management Unit (SMU) 408. As another example, the first operating environment 402 provides the one or more observed characteristics 406 as an argument or parameter to a function of the System Management Unit (SMU) 408. Having been provided 402 the one or more observed characteristics 406, the System Management Unit (SMU) 408 then performs 206 the comparison between the one or more observed characteristics 406 and the one or more expected characteristics and modifies 208 the one or more operational parameters based on the comparison.

Figure 5:
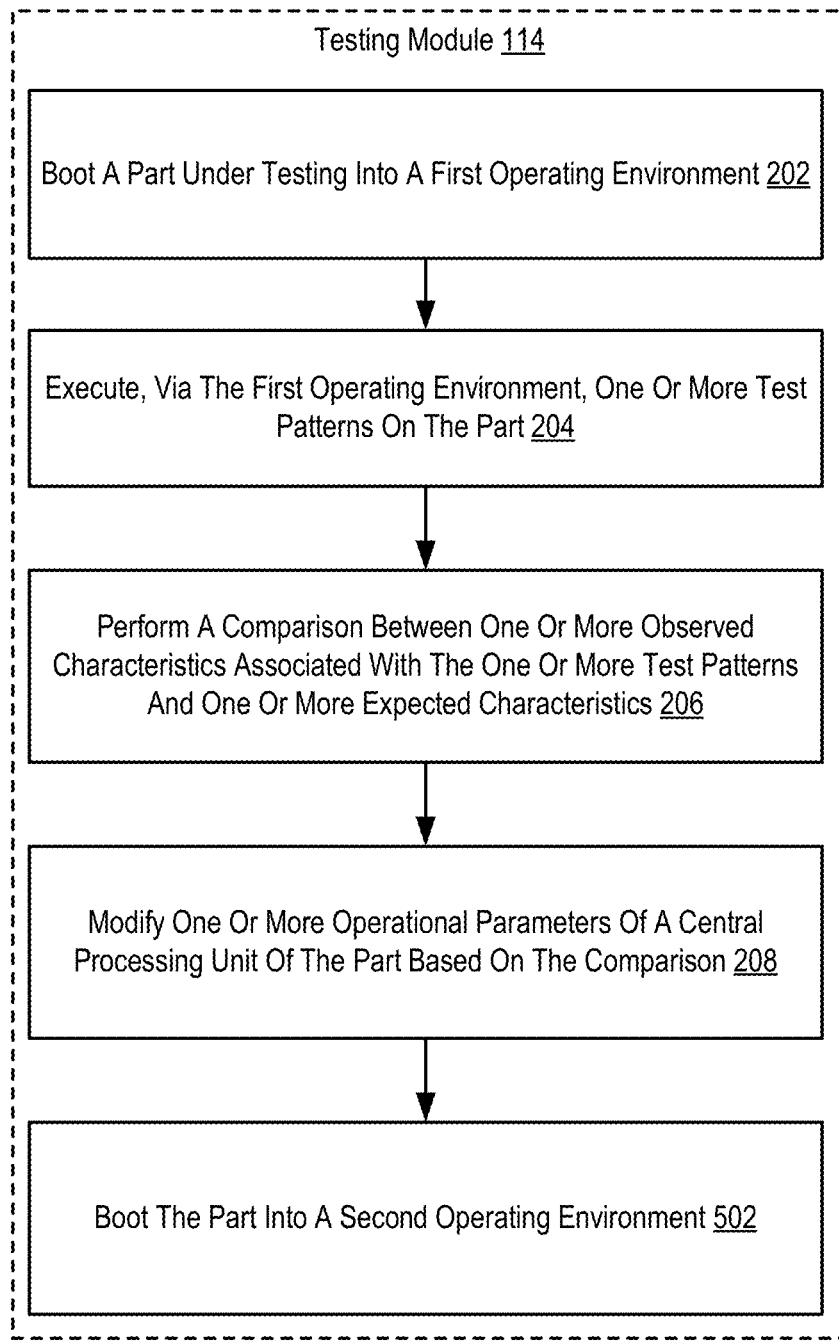
FIG. 5 is a flowchart of an example method for automatic part testing according to some embodiments.

For further explanation, FIG. 5 sets forth a flow chart illustrating an exemplary method for automatic part testing that includes booting 202 (e.g., by a testing module 114) a part under testing into a first operating environment; executing 204, via the first operating environment, one or more test patterns on the part; performing 206 a comparison between the one or more observed characteristics associated with the one or more test patterns and one or more expected characteristics; and modifying 208 one or more operational parameters of a central processing unit of the part based on the comparison.

The method of FIG. 5 differs from FIG. 2 in that the method of FIG. 5 also includes booting 502 the part into a second operating environment. For example, the second operating environment includes an operating system 110 (e.g., a main operating system 110 of the computer 100). Thus, after modifying 208 the one or more operational parameters, the testing module 114 automatically initiates booting 502 of the main operating system 110 for the user.

Figure 6:
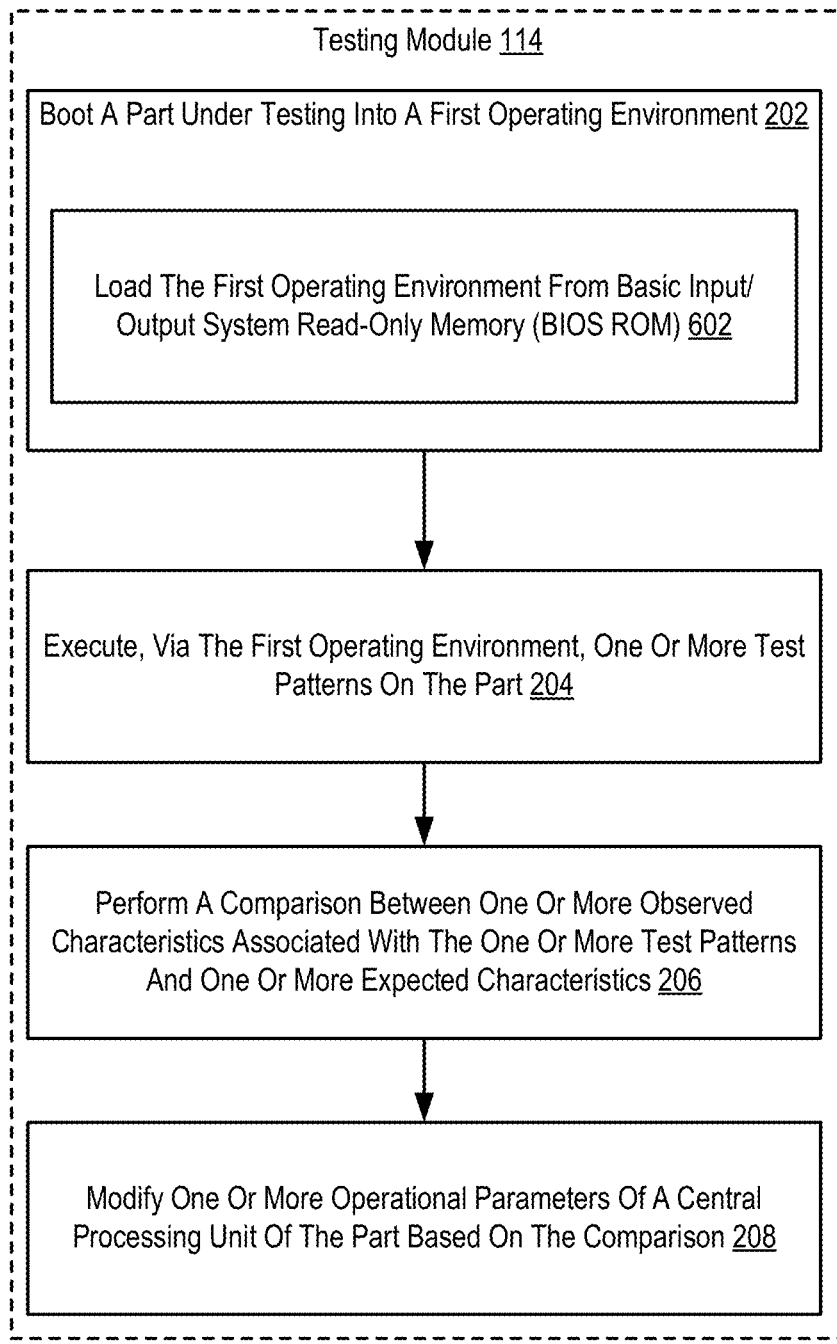
FIG. 6 is a flowchart of an example method for automatic part testing according to some embodiments.

For further explanation, FIG. 6 sets forth a flow chart illustrating an exemplary method for automatic part testing that includes booting 202 (e.g., by a testing module 114) a part under testing into a first operating environment; executing 204, via the first operating environment, one or more test patterns on the part; performing 206 a comparison between the one or more observed characteristics associated with the one or more test patterns and one or more expected characteristics; and modifying 208 one or more operational parameters of a central processing unit of the part based on the comparison.

The method of FIG. 6 differs from FIG. 2 in that booting 202 into a first operating environment includes loading 602 the first operating environment from Basic Input/Output System Read-Only Memory (BIOS ROM). For example, a boot operation of the computer 100 causes the first operating environment to be loaded 602 from Basic Input/Output System Read-Only Memory (BIOS ROM) to Random Access Memory (RAM) for execution. This distinguishes the first operating environment from other operating systems stored on disk or other mass storage prior to execution. This allows the first operating environment to be preinstalled on motherboards or other hardware components during manufacture.

In view of the explanations set forth above, readers will recognize that the benefits of automatic part testing according to embodiments of the present disclosure include:
- Improved performance of a computing system by automatically retesting hardware components over time.
- Improved performance of a computing system by automatically reconfiguring and tuning hardware components over time as performance changes.

Exemplary embodiments of the present disclosure are described largely in the context of a fully functional computer system for automatic part testing. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of automatic part testing, the method comprising:
   booting a computing system into a first operating system of a plurality of operating systems;
   executing one or more test patterns on a part under testing within the computing system while in the first operating system;
   performing a comparison between one or more observed characteristics associated with the one or more test patterns and one or more expected characteristics;
   modifying one or more operational parameters of a central processing unit of the computing system based on the comparison; and
   booting the computing system into a second operating system of the plurality of operating systems.

2. The method of claim 1, further comprising providing the one or more observed characteristics to one or more of a basic input/output system (BIOS) or a system management unit.

3. The method of claim 1, wherein modifying the one or more operational parameters of the central processing unit comprises applying an offset or a modification to a voltage frequency curve.

4. The method of claim 1, wherein:
   the one or more observed characteristics comprise a failure state; and
   modifying the one or more operational parameters comprises modifying the one or more operational parameters to avoid the failure state.

5. The method of claim 1, wherein the first operating system comprises a micro operating system separate from a primary operating system.

6. The method of claim 1, wherein the second operating system comprises a primary operating system.

7. The method of claim 1, wherein booting into the first operating system comprises loading the first operating system from basic input/output system read-only memory (BIOS ROM).

8. An apparatus for automatic part testing comprising at least one processor and memory, the apparatus configured to:
   boot a computing system into a first operating system of a plurality of operating systems;
   execute one or more test patterns on a part under testing within the computing system while in the first operating system;
   perform a comparison between one or more observed characteristics associated with the one or more test patterns and one or more expected characteristics;
   modify one or more operational parameters of a central processing unit of the computing system based on the comparison; and
   boot the computing system into a second operating system of the plurality of operating systems.

9. The apparatus of claim 8, further configured to provide the one or more observed characteristics to one or more of a basic input/output system (BIOS) or a system management unit.

10. The apparatus of claim 8, wherein modifying the one or more operational parameters of the central processing unit comprises applying an offset or a modification to a voltage frequency curve.

11. The apparatus of claim 8, wherein:
   the one or more observed characteristics comprise a failure state; and
   wherein modifying the one or more operational parameters comprises modifying the one or more operational parameters to avoid the failure state.

12. The apparatus of claim 8, wherein the first operating system is a micro operating system separate from a primary operating system.

13. The apparatus of claim 8, wherein the second operating system is a primary operating system.

14. The apparatus of claim 8, wherein booting into the first operating system comprises loading the first operating system from basic input/output system read-only memory (BIOS ROM).

15. A computer program product for automatic part testing, the computer program product disposed upon a non-transitory computer readable storage medium, the computer program product comprising computer program instructions that, when executed, cause a computer to perform steps comprising:
    booting a computing system into a first operating system of a plurality of operating systems;
    executing one or more test patterns on a part under testing within the computing system while in the first operating system;
    performing a comparison between one or more observed characteristics associated with the one or more test patterns and one or more expected characteristics;
    modifying one or more operational parameters of a central processing unit of the computing system based on the comparison; and
    booting the computing system into a second operating system of the plurality of operating systems.

16. The computer program product of claim 15, wherein the steps further comprise providing the one or more observed characteristics to one or more of a basic input/output system (BIOS) or a system management unit.

17. The computer program product of claim 15, wherein modifying the one or more operational parameters of the central processing unit comprises applying an offset or a modification to a voltage frequency curve.

18. The computer program product of claim 15, wherein:
    the one or more observed characteristics comprise a failure state; and
    wherein modifying the one or more operational parameters comprises modifying the one or more operational parameters to avoid the failure state.

19. The computer program product of claim 15, wherein the first operating system comprises a micro operating system separate from a primary operating system.

20. The computer program product of claim 15, wherein the second operating system comprises a primary operating system.

* * * * *